March 24, 1959
W. C. SCHMIDT
2,879,043
AGITATING APPARATUS
Filed May 25, 1956
2 Sheets-Sheet 1
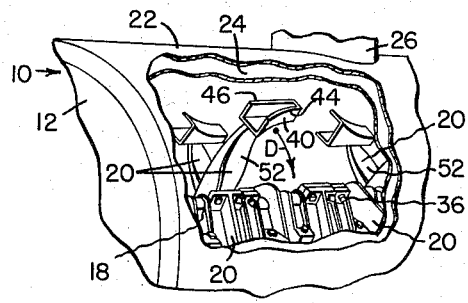
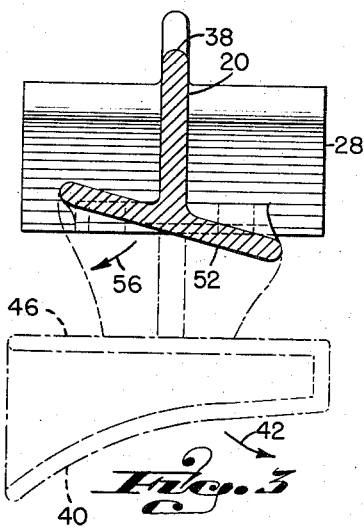
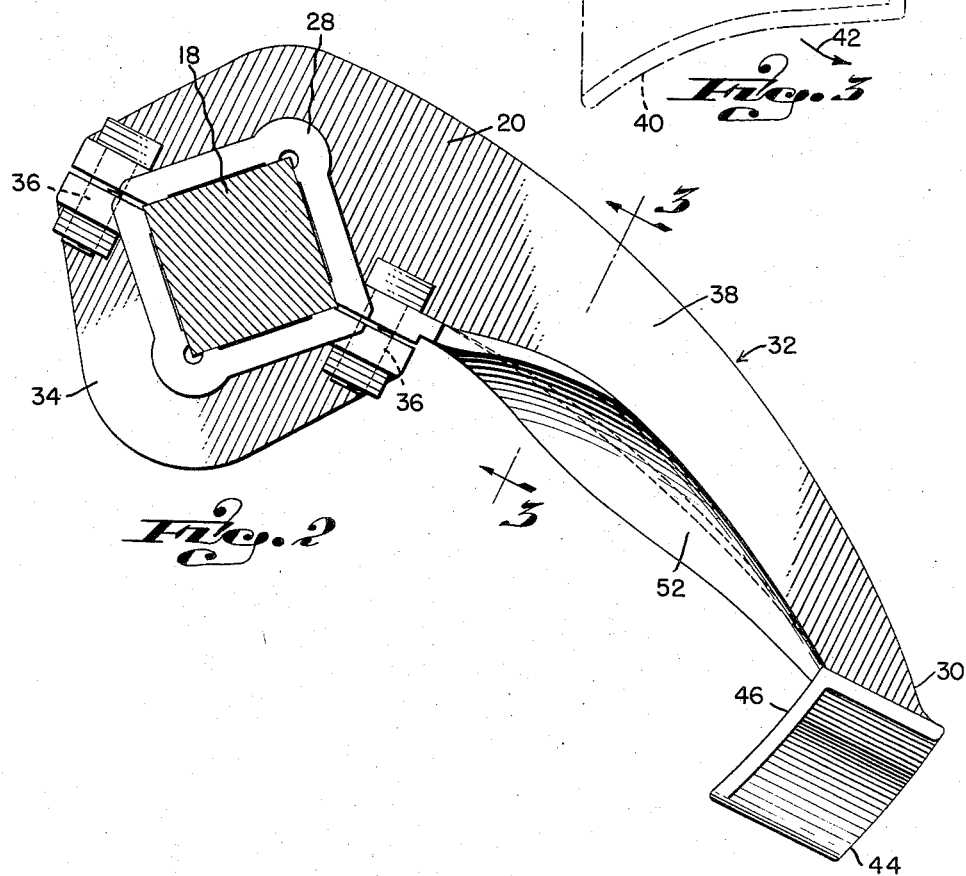
INVENTOR.
WILLIAM C. SCHMIDT
BY
J. Warren Kinney, Jr.
ATTORNEY March 24, 1959 W. C. SCHMIDT 2,879,043
AGITATING APPARATUS
Filed May 25, 1956 2 Sheets-Sheet 2
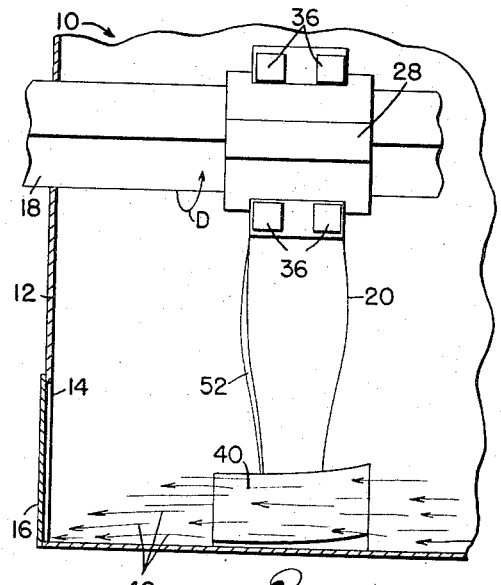
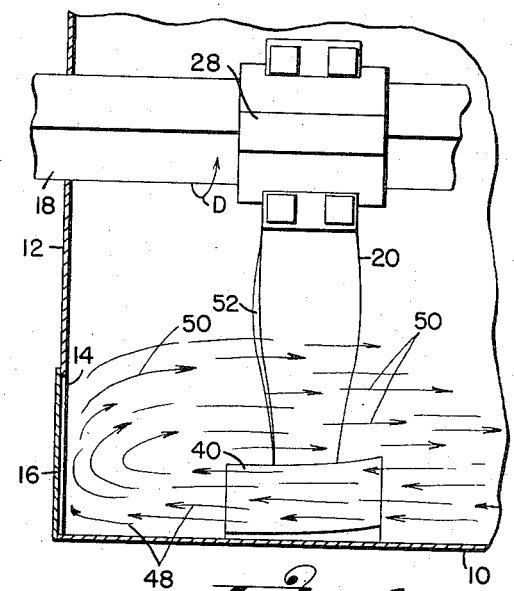
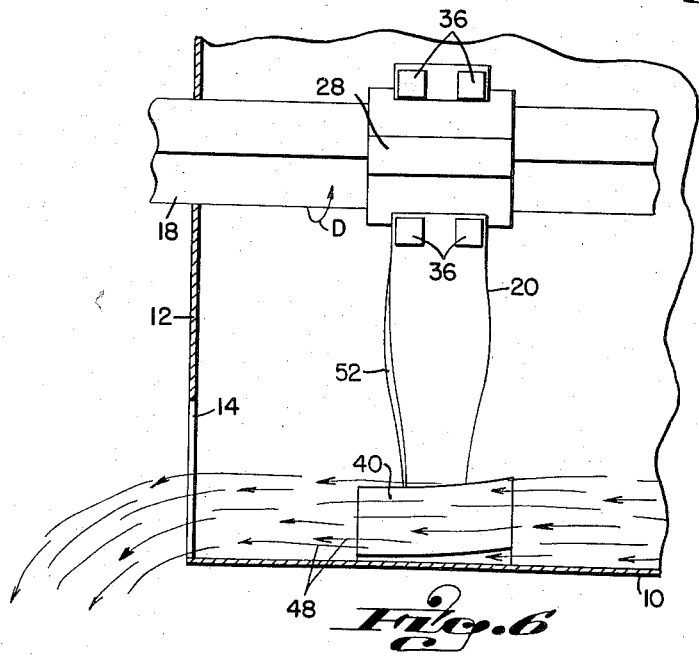
INVENTOR.
WILLIAM C. SCHMIDT
BY
J. Warren Kinney Jr.
ATTORNEY

United States Patent Office 2,879,043
Patented Mar. 24, 1959

2,879,043

AGITATING APPARATUS

William C. Schmidt, Cincinnati, Ohio, assignor to The Cincinnati Butchers' Supply Company, Cincinnati, Ohio, a corporation of Ohio Application May 25, 1956, Serial No. 587,383

6 Claims. (Cl. 259—45)

The present invention relates to improvements in an apparatus for agitating and controlling a substance which is characteristically fluid, or plastic to the extent that it can be made to flow. An example of such a substance is the waste from slaughtering establishments or abattoirs, consisting of fat, skin, bones and other animal products which generally are unfit for human consumption, but are reclaimable for commercial uses. Substances of the character mentioned may be cooked or rendered, to effect extraction of fats and oils, and this treatment generally is performed in a so-called dry rendering cooker which consists of a steam-jacketed cylindrical tank or shell containing the substance to be processed, and wherein is included means to agitate the substance during the cooking period. Proper and effective agitation and control of the plastic substance during treatment is the primary objective of the present invention, which concerns also certain improvements in mechanical means whereby the treatment may be performed.

An object of the invention is to simplify and expedite the processing of a substance requiring cooking and agitation, and subsequent handling.

Another object is to provide improved and simplified means for agitating a plastic substance in a tank, and discharging the substance following treatment.

Another object is to reduce the cost of equipment and labor needed for cooking and handling a substance undergoing processing in a tank or vessel charged with substance in a raw state.

These and other objects are attained by the means described herein and illustrated upon the accompanying drawings, in which:

Fig. 1 is a fragmentary perspective veiw of a steam-jacketed dry rendering cooker, including agitating and control means constructed in accordance with the present invention.

Fig. 2 is an enlarged side elevational view of an agitator embodying the invention, and shown applied to an agitator shaft.

Fig. 3 is a cross-sectional view taken on line 3—3 of Fig. 2.

Fig. 4 is a fragmentary cross-sectional view of the agitator within a tank, indicating flow of substance under certain conditions.

Fig. 5 is a view similar to Fig. 4, showing flow of substance under other conditions.

Fig. 6 is a view similar to Fig. 4, indicating discharge flow of substance from the tank after processing.

Although the invention herein is to be disclosed with reference to the processing and control of abattoir waste in a dry rendering cooker, it is to be understood that the particular example of usage here arbitrarily chosen shall not so limit the invention as to confine the usage to any particular field, or to operation upon any particular fluid substance, since application of the invention obviously may be extended to other fields and other substances without the exercise of inventive thought or activity. In fact, the means and method characterizing the present invention might find application wherever an intermixing of materials, or the mere agitation of a material, is to be performed, provided, of course, that the material undergoing treatment is so characterized as to respond to the forces imposed thereon by the elements of the invention.

Referring to Figs. 1 and 4, the character 10 indicates a tank or shell, preferably of elongate cylindrical form, having opposite ends one of which is shown at 12. The tank end may include a discharge port 14 normally closed tightly by means of a door or valve 16 to be displaced selectively or periodically for permitting discharge of a fluid or plastic mass from the tank. That end of the tank which is not shown upon the drawings may be identical to the end 12, although it need not include a discharge port such as 14.

Extending from end to end within the cylindrical tank 10 is an agitator shaft 18, which may be rotated axially of the tank in a single direction as indicated by arrows D applied to the several views. The shaft preferably, though not necessarily, is square in cross-section interiorly of the tank, and may be circular at its ends where the shaft is journalled in suitable bearings, not shown. The shaft 18 is adapted to carry a series of agitators arranged radially thereon, such agitators being indicated generally by the characters 20. The agitators 20 are identical to one another, wherefore a description of one will suffice for the others also.

If the tank 10 is to be heated, it may be surrounded by a cylindrical jacket 22 providing an annular space 24 all around the tank, and into this jacket space may be introduced steam or some other heating medium capable of cooking the contents of the tank. At its upper portion, the tank may be furnished with a charging hopper 26, through which may be passed the ingredients or substance to be cooked within the tank, while subjected to the action of the agitators. The arrows upon Figs. 1 and 4 indicate the direction of movement of the agitators, which may hereafter be referred to as the forward or advancing movement.

The agitators each may comprise a rigid arm having an anchor end 28, a head end 30, and an intermediate portion 32 of such length as to dispose the head end 30 in close proximity to the cylindrical wall of tank 10 when the agitator is affixed to shaft 18. The anchor end of the agitator may be mounted upon the agitator shaft in any suitable manner, one typical form of mount being illustrated by Fig. 2 wherein 34 indicates a cap clamping the shaft against the anchor portion of the agitator arm with the aid of screws or bolts 36. The agitator extends from the shaft 18 laterally, and preferably at approximately right angles, so that as the shaft rotates the agitator arm moves in a plane which is normal to the shaft axis. The character 38 indicates a reinforcing rib or spine formed integrally with the agitator arm and extending substantially the full length thereof.

The head at the free end of the agitator is an enlargement, and may be developed to provide a transverse face 40 (Fig. 1), which is inclined relatively to the plane of advancing movement of the agitator arm, so that as the head advances through the contents of the tank, some portion of the contents will be impelled lengthwise of the tank, or toward one end thereof. In addition to being inclined as stated, the propulsion face 40 may be curved as shown, to provide a concavity therein which aids propulsion of the substance undergoing agitation, in the direction of arrow 42, Fig. 3. The arrow D in Fig. 1 is intended to indicate the normal direction of movement of the agitators.

At the extreme outer end of face 40 may be formed a leading edge 44, having the same curvature as the face 40, and serving as a skimming edge to dislodge partly cooked substance from the inner cylindrical surface of the tank so that such dislodged substance might be influenced by the propulsion face to move toward one end of the tank as previously explained. A backing plate 46 formed integrally with the head lends strength and rigidity to the head structure including the propulsion face.

From the foregoing, it will readily be understood that advancement of all the agitators in the direction indicated, with the propulsion face 40 leading, will cause flow of substance along the bottom of the tank in the direction indicated by the group of arrows 48 in Figs. 4 and 6. If the discharge port happens to be open, as in Fig. 6, the contents of the tank will be induced to leave the tank through the discharge port. On the other hand, if the port is closed as in Fig. 4, there will be a tendency for the substance to pile up or compact against the end wall 12 of the tank, with resultant loss of agitator action and a dearth of substance in contact with the cooking area near the opposite end of the tank. To avoid such lack of proper distribution within the tank, each agitator is provided with means to effect a counterflow of substance toward the unported end of the tank, that is, the starved end not shown upon the drawings.

The counterflow mentioned above is indicated by the group of arrows 50 in Fig. 5, wherein the gate or valve 16 is shown in closed position. To effect the counterflow, each agitator may be provided, intermediate its ends 28 and 30, with a secondary propulsion face 52 designed to propel substance at a higher level within the tank, in a direction opposite to the flow of the primary current 48. In Fig. 5, the primary current or flow is indicated at 48, wehreas the counterflow is indicated at 50. These opposing flows are maintained simultaneously within the tank, and with the agitators advancing in one direction only.

The secondary propulsion face 52 is a leading face, and is formed integrally with the agitator arm intermediate the ends thereof. Its inclination with relation to the plane in which the agitator arm moves during rotation of shaft 18 is opposite to the inclination of the primary propulsion face 40 on the head of the agitator, the result being, therefore, to impel substance oppositely in direction, to the flow induced by face 40.

It may be noted that the secondary propulsion face 52, Fig. 2, is extensive in the direction of the agitator length, in comparison with its width, so that regardless of the depth of substance lying upon the tank bottom, an upper level thereof will be influenced by the secondary face 52 to induce counterflow. In designing the secondary propulsion face 52, care should preferably be exercised to impart to said face a capacity for movement of substance which approximately equals the propulsion capacity of the primary face 40, taking into consideration the difference in travel between the two faces due to their respective distances from the agitator shaft. In general the area of the secondary propulsion face should exceed that of the primary propulsion face, if the pitch or inclination is equal. Some degree of gain may be achieved, however, by varying the pitch or inclination of the faces. In any event, it is desirable that the propulsion effect or capacity of the faces be approximately equal if maximum results are to be attained.

With respect to the differing inclinations of propulsion faces 40 and 52, reference is invited to Fig. 3 of the drawings, wherein is clearly indicated the fact that the faces if extended would converge at the right side of the figure. That is to say, the inclinations of the faces are oppositely directed with respect to a plane which includes the center rib 38. The arrows 42 and 56 indicate defections of tank materials in opposite directions transversely of the agitator, with unidirectional advancement of the agitator.

From the foregoing, it will be apparent that substance introduced into the tank through the hopper opening will be thoroughly agitated and cooked to render out the fat content, leaving the more solid residue as a precipitant to be automatically discharged from the tank through port 14 by the mere opening of said port while the agitator is in motion. Usually the fat and other liquid constituents are drawn off from time to time with the aid of cocks or valves, not shown, so that the residue finally discharged by way of port 14 is largely in the form of solids or crackling fairly relieved of its initial liquid content. As previously stated herein, the equipment disclosed is useful for purposes other than that of rendering animal matter, and under certain conditions of use the provision of heating means in connection with the tank may be unnecessary.

It is to be understood that various modifications and changes in structural details of the device may be made, within the scope of the appended claims, without departing from the spirit of the invention.

What is claimed is:

1. An agitator for working a plastic substance, comprising an elongate arm movable in a single direction of advancement through the substance, said arm having a free end, an anchor end, an intermediate portion, and an elongate reinforcing rib extending from the free end to the anchor end, means at the anchor end for securing said arm to a shaft, a pair of propulsion faces on the arm, one such face being located at the free end of the arm, and the other being located on the intermediate portion of the arm, said propulsion faces being located on the same side of said reinforcing rib and inclined in opposite directions relative to the plane of advancing movement of the arm, for propelling plastic substance in opposite directions simultaneously as the agitator advances through the substance in a single direction.

2. An agitator for working a plastic substance within an elongate tank, said agitator comprising an elongate arm movable in a single direction of advancement through the substance, said arm having a free end, an anchor end, and an intermediate portion, means at the anchor end for securing said arm to a rotary shaft, a pair of propulsion faces on the arm, one such face being located at the free end of the arm, and the other being located on the intermediate portion of the arm, said propulsion faces being inclined in opposite directions relative to the plane of advancing movement of the arm through the substance, for propelling portions of the substance in opposite directions simultaneously lengthwise of the tank as the agitator advances through the substance in a single direction, the area of the intermediate propulsion face being greater than the area of the endmost propulsion face, whereby the capacities of the faces to move the substance are aproximately equal.

3. A cooker comprising in combination a heated cylindrical tank closed at opposite ends, one end having a discharge port therein, and a gate for selectively opening said port, a rotatable shaft extending axially through the tank, and a series of agitators carried by said shaft interiorly of the tank, said agitators each comprising an elongate arm, means at one end of the arm fixing said arm to the shaft radially of the tank, and a head at the opposite end of the arm, said head including an elongate skimming edge parallel with and in close proximity to the tank wall for dislodging substance adhering to said wall, a primary propulsion face on the head, coextensive with said skimming edge and a narrow, elongate secondary propulsion face on the arm intermediate the head and the fixed end of the arm, said propulsion faces being inclined in opposite directions relative to the plane of movement of the agitator, for propelling fluid substance in opposite directions simultaneously as the agitator moves through the substance in a single direction.

4. Agitating apparatus comprising in combination a cylindrical tank closed at opposite ends, one end having a discharge port therein, and a gate for selectively opening said port, a rotatable shaft extending axially through the tank, and a series of agitators carried by said shaft interiorly of the tank, said agitators each comprising a rigid, straight, elongate arm having a free end, an anchor end, and an intermediate portion, means at the anchor end for securing said arm to the shaft radially of the tank, with the free end of the arm proximate to the shell, and propulsion means at the free end and at the intermediate portion of the arm, for stratifying substance undergoing treatment within the tank, and moving two strata of substance in opposite directions simultaneously and at different levels, toward opposite ends of the tank the propulsion means at the intermediate portion of the arm being greater in area than the propulsion means at the free end thereof, whereby the capacities of the faces to move the substance are approximately equal.

5. Agitating apparatus for plastic substance comprising in combination, a substantially horizontal stationary tank including upright end walls, one of said end walls having a discharge port at a low elevation upon said one end wall, and through which the substance in the tank may flow by gravity, a gate for selectively opening and closing said port, a rotatable shaft extending through the tank from one end wall to the other and at an elevation above the discharge port, a series of agitators carried by said shaft interiorly of the tank, said agitators each including a primary propulsion face for moving a lower stratum of substance lengthwise in the tank toward and against the gate when closed, and through the port when the gate is opened, during rotation of the shaft in one direction, and secondary propulsion faces on the agitators operative while the shaft rotates in the same direction, to move an upper stratum of the substance lengthwise of the tank in an opposite direction of flow away from the discharge port, said secondary propulsion face having an effective area exceeding that of the primary propulsion face, whereby the capacities of the faces to move the substance are approximately equal.

6. A cooker comprising in combination a heated cylindrical tank closed at opposite ends, one end having a discharge port therein, and a gate for selectively opening said port, a rotatable shaft extending axially through the tank, and a series of agitators carried by said shaft interiorly of the tank, said agitators each comprising an elongate arm, means at one end of the arm fixing said arm to the shaft radially of the tank, and a head at the opposite end of the arm, said head including an elongate skimming edge parallel with and in close proximity to the tank wall for dislodging substance adhering to said wall, a primary propulsion face on the head coextensive with said skimming edge, and a narrow, elongate secondary propulsion face on the arm intermediate the head and the fixed end of the arm, said propulsion faces being inclined in opposite directions relative to the plane of movement of the agitator, for propelling fluid substance in opposite directions simultaneously as the agitator moves through the substance in a single direction, the area of the intermediate propulsion face being greater than the area of the endmost propulsion face.

References Cited in the file of this patent

UNITED STATES PATENTS

| | | |
|---|---|---|
| 980,809 | Mattheiss | Jan. 3, 1911 |
| 2,017,116 | Bonnell | Oct. 15, 1935 |
| 2,289,613 | Weinrich | July 14, 1942 |
| 2,650,807 | Bilek | Sept. 1, 1953 |